(No Model.)
J. A. REKENTHALER.
SHIELD FOR CORN CULTIVATORS.
No. 563,508. Patented July 7, 1896.
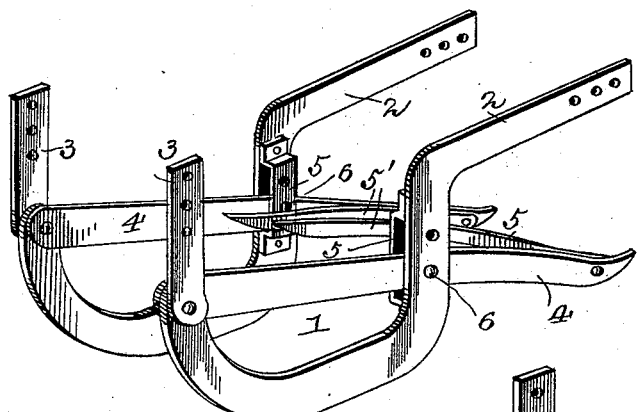
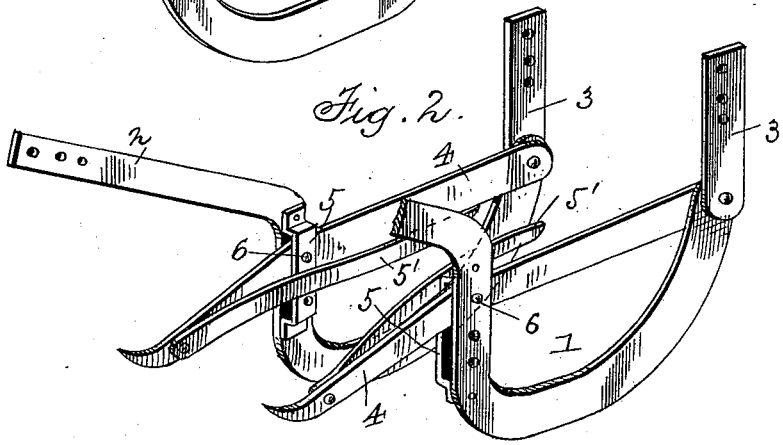
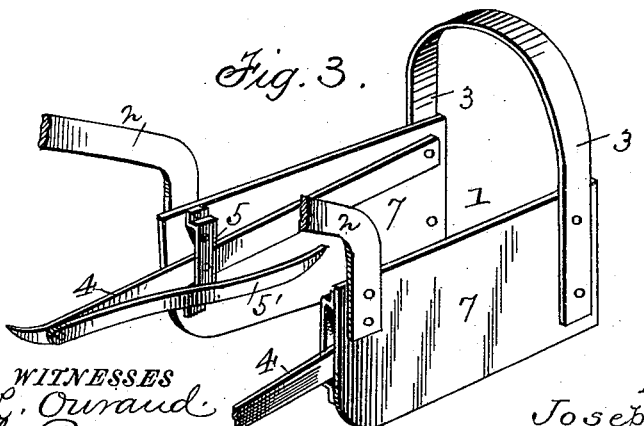
WITNESSES
J. L. Ouraud
E. A. Brune
INVENTOR:
Joseph A. Rekenthaler
By H. D. Willson
Attorney

UNITED STATES PATENT OFFICE.

JOSEPH ALBERT REKENTHALER, OF CUSHING, IOWA.

SHIELD FOR CORN-CULTIVATORS.

SPECIFICATION forming part of Letters Patent No. 563,508, dated July 7, 1896.

Application filed September 30, 1895. Serial No. 564,142. (No model.)

*To all whom it may concern:*

Be it known that I, JOSEPH ALBERT REKENTHALER, a citizen of the United States, residing at Cushing, in the county of Woodbury and State of Iowa, have invented certain new and useful Improvements in Shields for Corn-Cultivators; and I do declare the following to be a full, clear, and exact description of the invention, such as will enable others skilled in the art to which it appertains to make and use the same.

My invention relates to shields for corn-cultivators.

The object of my invention is to provide a device to be attached to a corn-cultivator of either a disk or plow form, such device being designed to pick up the down or leaning corn, so as to allow it to pass in an upright position through the shield, so that the shield will not run over the stalks and break or injure them, thus effecting a great saving in the cultivation of young corn.

With this object in view the invention consists of certain features of construction and combination of parts which will be hereinafter described and claimed.

In the accompanying drawings, Figure 1 is a detailed perspective view of my improved shield, showing the prongs lowered at their lowest point. Fig. 2 is a similar view showing the prongs elevated; and Fig. 3 is a view similar to Fig. 1, showing a modification of my invention.

In the drawings, 1 denotes a frame, 2 the draft-bars secured at its front end, and 3 arms projecting from the rear end of said frame to be attached to the cultivator.

4 denotes the prongs, the rear ends of which are pivoted to the rear ends of the frame, and the forward ends of which are arranged between the inner sides of the forward ends of the frame, and a strip 5 bolted thereto.

6 denotes adjusting-bolts, between which the prongs are held in either an operative or inoperative position. By removing these bolts and lifting the prong upward it will be held out of contact with the ground and allow the machine to be dragged along from one place to another. When in use, the front ends of the prongs are lowered and the bolts are so arranged as to hold the prongs in contact with the ground, so that any fallen or leaning corn will be picked up by the prongs and allowed to pass in an upright position. Pivoted to the front end of the prongs are curved guards 5, which project rearward and serve to guard the corn when passing through between the shovel or disk of the cultivator. These guards may be raised or lowered to the size of the corn, as they have a sufficient frictional bearing at their point of attachment to the prong to hold them in any adjustable position.

The modification shown in Fig. 3 consists in bolting to the frame shield-plates 7, which are used when the corn is very young and small. When it has grown to quite a height, these shield-plates are removed.

Having thus described my invention, what I desire to secure by Letters Patent of the United States is—

The combination with the frame, of prongs pivoted thereto, means for holding the prongs in any desired lowered or elevated adjustment, guards pivoted to the front ends of said prongs curved inward and projecting rearward, and shield-plates removably connected with the frame, substantially as specified.

In testimony whereof I affix my signature in presence of two witnesses.

JOSEPH ALBERT REKENTHALER.

Witnesses:
WILLIAM BUCHANAN,
HENRY GLOE.